(12) United States Patent
Janz et al.

(10) Patent No.: US 11,255,397 B2
(45) Date of Patent: Feb. 22, 2022

(54) AIR SPRING

(71) Applicant: ContiTech Luftfedersysteme GmbH, Hannover (DE)

(72) Inventors: Marcus Janz, Seelze (DE); Kristian Thiele, Erfurt (DE); Marc Leinemann, Hannover (DE)

(73) Assignee: ContiTech Luftfedersysteme GmbH, Hannover (DE)

( * ) Notice: Subject to any disclaimer, the term of this patent is extended or adjusted under 35 U.S.C. 154(b) by 75 days.

(21) Appl. No.: 16/614,850

(22) PCT Filed: Mar. 1, 2018

(86) PCT No.: PCT/EP2018/055003
§ 371 (c)(1),
(2) Date: Nov. 19, 2019

(87) PCT Pub. No.: WO2018/219508
PCT Pub. Date: Dec. 6, 2018

(65) Prior Publication Data
US 2021/0156446 A1    May 27, 2021

(30) Foreign Application Priority Data

May 31, 2017   (DE) ..................... 10 2017 209 199.1

(51) Int. Cl.
*F16F 9/05*   (2006.01)
*F16F 9/04*   (2006.01)

(52) U.S. Cl.
CPC ............ F16F 9/057 (2013.01); F16F 9/0454 (2013.01); *F16F 2226/045* (2013.01)

(58) Field of Classification Search
CPC .. F16F 9/057; F16F 9/0454; F16F 9/05; F16F 9/0463; F16F 2230/0023; F16F 2224/0241; F16F 2226/041; B60G 11/27; B60G 2202/152; B60G 2206/70
See application file for complete search history.

(56) References Cited

U.S. PATENT DOCUMENTS

| 7,681,868 B2* | 3/2010 | Scholz | F16F 9/05 |
| | | | 267/64.27 |
| 2003/0116898 A1* | 6/2003 | Leonard | F16F 9/0454 |
| | | | 267/64.27 |

(Continued)

FOREIGN PATENT DOCUMENTS

| DE | 4230249 A1 | 3/1994 |
| DE | 10354574 B3 | 1/2005 |

(Continued)

OTHER PUBLICATIONS

International Search Report dated Jun. 18, 2018 of international application PCT/EP2018/055003 on which this application is based.

*Primary Examiner* — Pamela Rodriguez
(74) *Attorney, Agent, or Firm* — Gregory Adams; David L. Cate

(57) ABSTRACT

The invention relates to an air spring having:
a rolling bellows (1) with an opening which has a bead (2) reinforced by a core (3) and
a rolling piston (4) with a seat (5) for the rolling bellows (1) and a support shoulder (7) for the rolling bellows (1), wherein when the rolling bellows (1) is in the mounted state, its end assigned to the rolling piston (4) is connected to the rolling piston (4) in an airtight manner by a clamping fit between the bead (2) and the seat (5) of the rolling piston (4), and the bead (2) of the rolling bellows (1) rests at least partly on the support shoulder (7), wherein the rolling piston (4) is made of a thermoplastic material. The object of the invention is to improve an air spring of the type outlined above such that the bellows (1) can very reliably and simply be prevented from slipping off the piston (4), in particular in view of the use of plastic as the piston material. This is achieved in that on the seat (5) for the rolling bellows (1), the rolling piston (4) has an axially protruding, substantially (Continued)

cylindrical securing ring (8), which protrudes axially beyond the bead (2) of the rolling bellows (1) after mounting of the rolling bellows (1) on the seat (5), can be plasticized by an at least partial heating process, and in the plasticized state can be deformed radially outwardly over the bead (2) of the rolling bellows (1) by a forming die (9, 10, 11) such that the bead (2) is at least partly surrounded by the deformed securing ring (8).

4 Claims, 4 Drawing Sheets

(56) References Cited

U.S. PATENT DOCUMENTS

| | | | |
|---|---|---|---|
| 2012/0161375 | A1 | 6/2012 | Koeske |
| 2013/0147100 | A1 | 6/2013 | Schaefers |
| 2017/0023085 | A1* | 1/2017 | Trowbridge .......... F16F 9/0463 |

FOREIGN PATENT DOCUMENTS

| | | | |
|---|---|---|---|
| DE | 102007055077 A1 | | 5/2009 |
| DE | 102008055511 A1 | | 6/2010 |
| DE | 102012100753 A1 | | 8/2013 |
| DE | 102013113124 A1 | | 5/2015 |
| EP | 2603715 A1 | | 6/2013 |
| EP | 2775162 A2 | | 9/2014 |
| EP | 3165786 A1 | | 5/2017 |
| EP | 3361118 A1 | * | 8/2018 |
| WO | 2013072116 A1 | | 5/2013 |
| WO | 2013182419 A1 | | 12/2013 |

\* cited by examiner

AIR SPRING

BRIEF SUMMARY OF THE INVENTION

The invention relates to an air spring having:
- a rolling bellows with an opening which has a bead reinforced by a core and
- a rolling piston with a seat for the rolling bellows and a support shoulder for the rolling bellows, wherein when the rolling bellows is in the mounted state, its end assigned to the rolling piston is connected to the rolling piston in an airtight manner by means of a clamping fit between the bead and the seat of the rolling piston, and the bead of the rolling bellows rests at least partly on the support shoulder, wherein the rolling piston is made of a thermoplastic material.

Such air springs are known in themselves and in use. The problem of said airtight connection between the bellows bead and the seat of the rolling piston is that there is a danger that the bellows bead may slip off the piston seat, for example when the air spring extends.

To avoid this, various solution approaches are known. DE EE 10 2008 055 511 A1 discloses a rolling piston having a conical seat for the rolling bellows. To prevent slipping, the conical seat has a retaining lug which makes slipping more difficult.

EP 2 603 715 B1 discloses a rolling piston in which a groove is arranged in the conical seat, into which a type of circlip can be snap-fitted after mounting of the bellows. This prevents the conical seat of the rolling bellows from slipping.

In practice however, these solutions have not always proved satisfactory in particular cases.

WO 2013 072 116 A1 discloses an air spring with a rolling piston in which slipping of the bellows is prevented by a screw-fit cover.

DE 10 2012 100 753 A1 describes an air spring in which the bellows is held on the conical seat of the rolling piston by a press-fit securing ring.

These solutions indeed offer a high degree of security against slipping but require additional components, which makes mounting complex and cost-intensive.

The object of the invention is to improve an air spring of the type outlined above such that the bellows can very reliably and simply be prevented from slipping off the piston, in particular in view of the use of plastic as the piston material.

This is achieved in that on the seat for the rolling bellows, the rolling piston has an axially protruding, substantially cylindrical securing ring, which protrudes axially beyond the bead of the rolling bellows after mounting of the rolling bellows on the seat, can be plasticized by an at least partial heating process, and in the plasticized state can be deformed radially outwardly over the bead of the rolling bellows by means of a forming die such that the bead is at least partly surrounded by the deformed securing ring.

The plastic deformation is stable after cooling, and prevents the rolling bellows from being able to slip off the seat of the rolling piston.

In a refinement of the invention, in its substantially conical region, the forming die has a forming region around the periphery which is curved concavely toward the radial outside, wherein a first small diameter of the forming region curved concavely toward the outside fits into the undeformed securing ring of the seat of the rolling piston.

In this way, the securing ring can be shaped around the bead of the rolling bellows so as to give a particularly high degree of security against slipping.

In a refinement of the invention, in the plasticized state the securing ring can be deformed around the bead of the rolling bellows such that the bead can be pressed against the support shoulder of the rolling piston.

This shaping gives an additional press fit between the bead of the rolling bellows and the support shoulder which improves the seal of the connection of the rolling bellows and rolling piston.

The invention furthermore concerns a method for production of an air spring of the type outlined above, wherein the air spring comprises:
- a rolling bellows with an opening which has a bead reinforced by a core and
- a rolling piston with a seat for the rolling bellows and a support shoulder for the rolling bellows, wherein the seat of the rolling piston has an axially protruding, substantially cylindrical securing ring, which, after mounting of the rolling bellows on the seat, protrudes axially beyond the bead of the rolling bellows, and the rolling piston is made of a thermoplastic material.

Conventional air springs are often mounted by simply pushing the rolling bellows with its bead onto the seat of the rolling piston, wherein the rolling bellows is additionally secured against slipping off the seat by retaining lugs, securing rings or screw-fit covers. These securing methods are however relatively complex or unreliable.

The invention is therefore based on the object of providing a method for producing an air spring of the type outlined above which allows a simple and secure connection of the rolling bellows to the rolling piston.

This object is achieved in that the method has at least the following steps, namely:
- placing of the rolling bellows on the seat of the rolling piston,
- at least partial heating of the axially protruding securing ring of the rolling piston to the plasticization temperature of the plastic material of the rolling piston,
- insertion of a forming die in the securing ring of the seat of the rolling piston, wherein the forming die has at least one substantially conical region, the first small diameter of which fits in the seat of the rolling piston, and the second diameter of which is larger than the first diameter,
- axial pressing of the forming die into the securing ring of the rolling piston, wherein the conical region of the forming die shapes the seat of the rolling piston toward the radial outside,
- removal of the forming die.

Because of the outwardly oriented shaping, the seat of the rolling piston is wider in its upper end assigned to the rolling bellows. This prevents the bead of the rolling bellows from slipping off the seat.

In a refinement of the invention, in its substantially conical region, the forming die has a forming region around the periphery which is curved concavely toward the radial outside, wherein a first small diameter of the forming region curved concavely toward the outside fits into the undeformed securing ring of the seat of the rolling piston, wherein when the forming die is pressed in, the securing ring (8) of the rolling piston is not only pressed toward the outside but also deformed around the bead of the rolling bellows following the curvature of the forming die.

In this way, the securing ring is shaped around the bead of the rolling bellows so as to give a particularly high degree of security against slipping.

BRIEF DESCRIPTION OF THE SEVERAL VIEWS OF THE DRAWING

An example of the invention will be explained in more detail below on the basis of the drawing. The drawing shows.

DETAILED DESCRIPTION OF THE INVENTION

Figure 1:
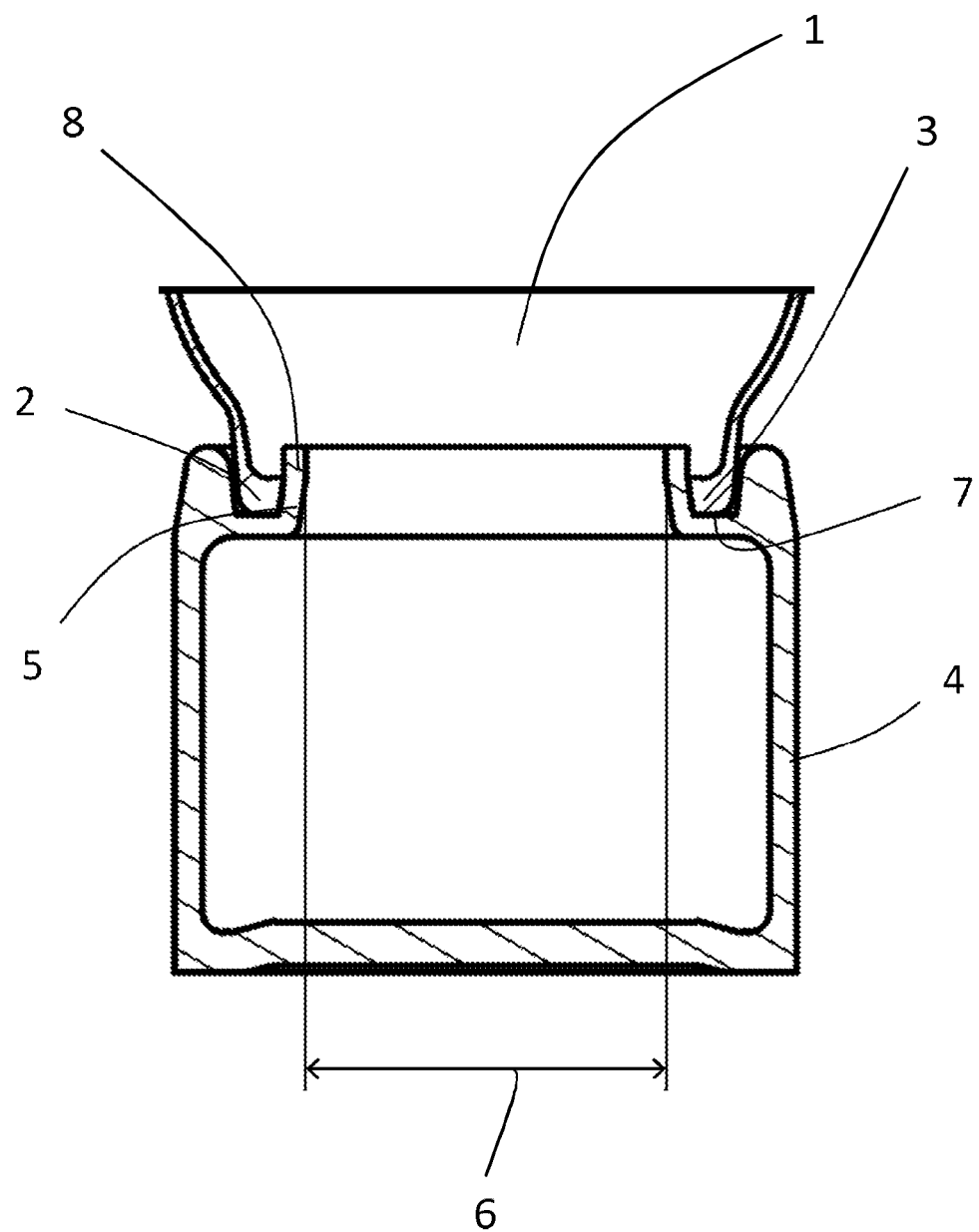
FIG. 1 in longitudinal section, a rolling bellows and a rolling piston in assembled state, FIG. 2 the assembled air spring with an inserted combined heating and forming die, FIG. 3 the combined heating and forming die further inserted, with the shaped seat of the rolling piston, and FIG. 4 a fully mounted air spring.

FIG. 1 shows a rolling bellows 1 with a bead 2. The bead 2 has an embedded to strengthening member 3 around its periphery. A rolling piston 4 has a partly conically shaped seat 5 with an inner diameter 6. A support shoulder 7 serves for better rolling of the rolling bellows 1 on the rolling piston 4 when the air spring is fully assembled. The seat 5 has a securing ring 8 axially adjoining the seat 5 and integrally connected to the seat 5. The bead 2 of the rolling bellows 1 is pushed onto the seat 5. The securing ring 8 protrudes beyond the bead 2 by a predefined extent.

Figure 2:
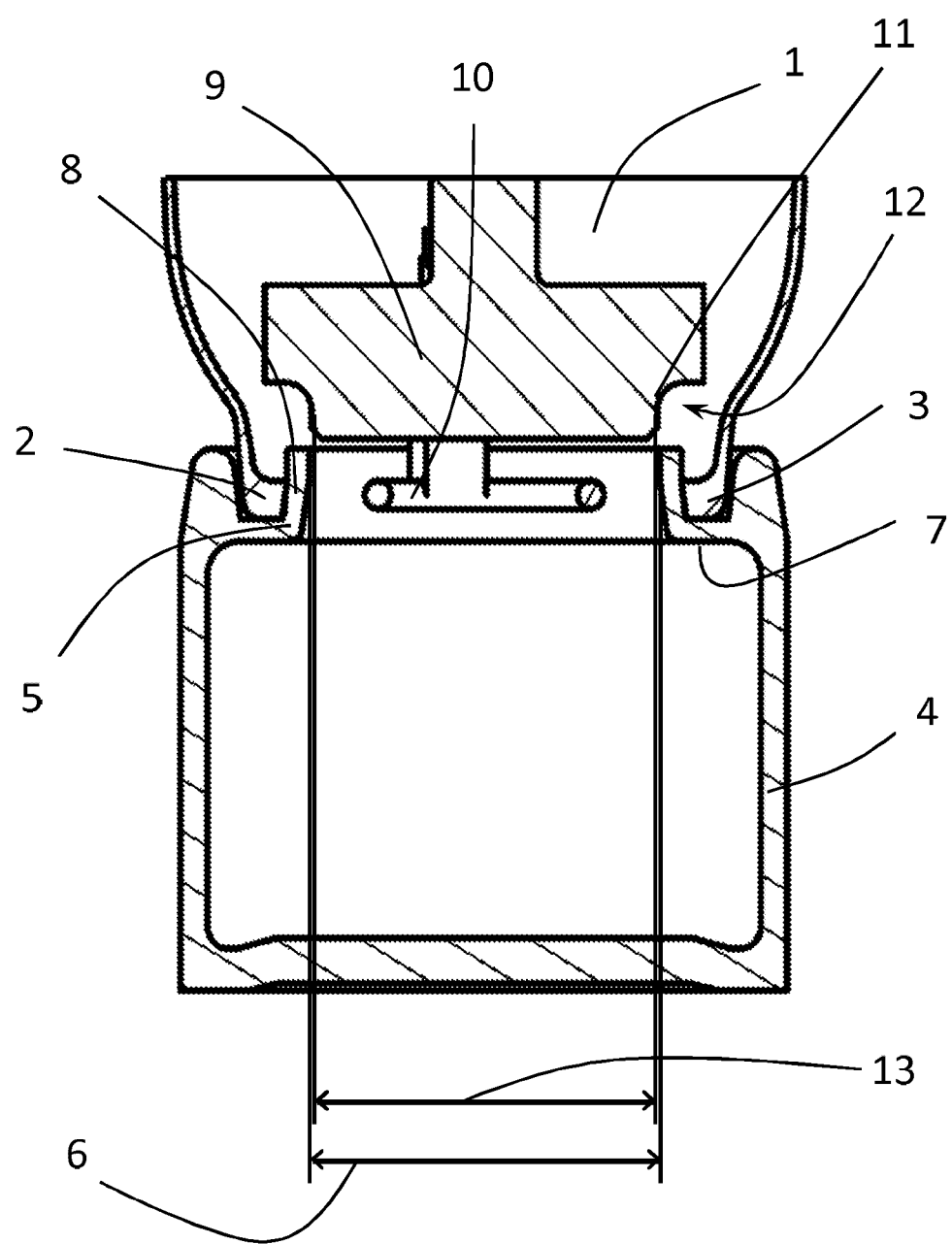

FIG. 2 shows a combined heating and forming die 9 inserted in the rolling bellows 1. The combined heating and forming die 9 has a heat radiator 10 and a forming tool 11. The forming tool 11 has a forming region 12 formed at least partially conical and curved concavely toward the radial outside. A first diameter 13 of the forming tool 11 corresponds to the inner diameter 6 of the seat 5. The securing ring 8 can be heated to plasticization temperature by the heat radiator 10.

Figure 3:
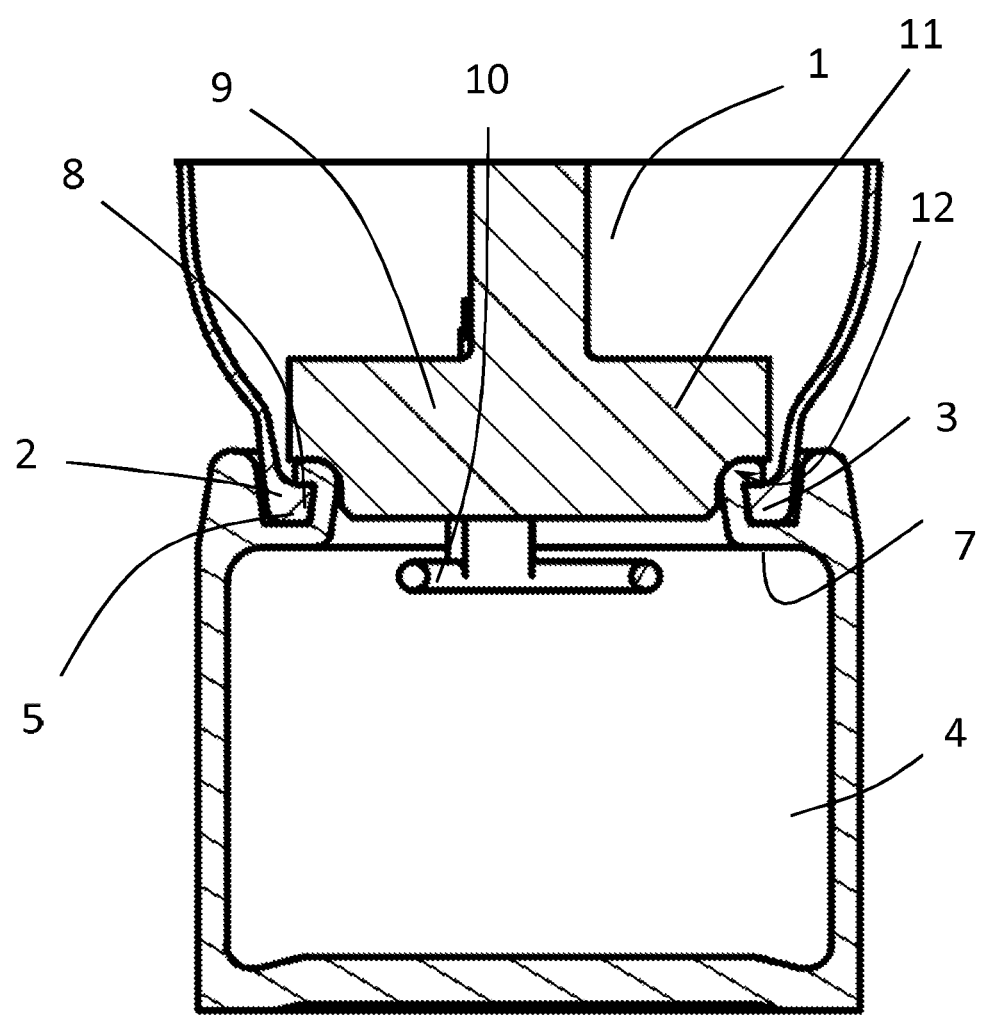

FIG. 3 shows the combined heating and forming die 9 inserted further into the seat 5 of the rolling piston 4. The securing ring 8 is here deformed by the deforming region 12, running around the periphery and curved concavely toward the radial outside, and engages over the bead 2 of the rolling bellows 1 corresponding to the contour of the forming region 12.

Figure 4:
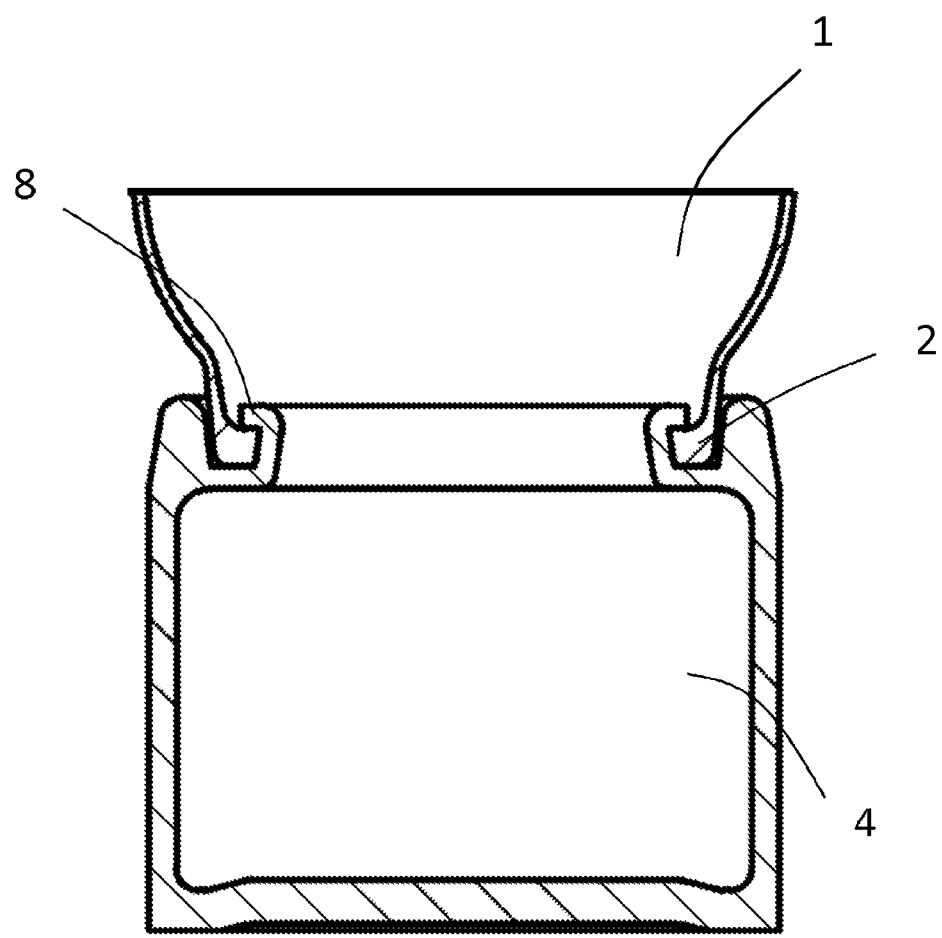

FIG. 4 shows the finished connection of rolling bellows 1 and rolling piston 4. After cooling and associated hardening of the shaped securing ring 8, the rolling bellows 1 is inseparably connected to the rolling piston 4. The shaped securing ring 8 presses the bead 2 axially onto the rolling piston 4. This increases the security of the airtightness.

LIST OF REFERENCE SIGNS

Part of the Description

1 Rolling bellows
2 Bead of the rolling bellows 1
3 Core, strengthening member of the bead 2
4 Rolling piston
5 Seat of the rolling piston 4
6 Inner diameter of seat 5
7 Support shoulder of the rolling piston 4
8 Securing ring on seat 5
9 Combined heating and forming die
10 Heat radiator
11 Forming tool
12 Curved forming region of forming tool 11
13 First small diameter of forming tool 11

The invention claimed is:

1. An air spring, comprising:
a rolling bellows with an opening which has a bead reinforced by a core;
a rolling piston with a seat for the rolling bellows and a support shoulder for the rolling bellows;
wherein when the rolling bellows is in a mounted state, its end assigned to the rolling piston is connected to the rolling piston in an airtight manner by a clamping fit between the bead and the seat of the rolling piston, and the bead of the rolling bellows rests at least partly on the support shoulder, wherein the rolling piston is made of a thermoplastic material;
wherein on the seat for the rolling bellows, the rolling piston has an axially protruding, substantially cylindrical securing ring, which protrudes axially beyond the bead of the rolling bellows after mounting of the rolling bellows on the seat, can be plasticized by an at least partial heating process, and in a plasticized state can be deformed radially outward over the bead of the rolling bellows by means of a forming die such that the bead is at least partly surrounded by the deformed securing ring;
the forming die includes a substantially conical region; and
in the substantially conical region, the forming die has a forming region around the periphery which is curved concavely toward a radial outside, wherein a first small diameter of the forming region curved concavely toward the outside fits into the undeformed securing ring of the seat of the rolling piston.

2. The air spring as claimed in claim 1, wherein in the plasticized state, the securing ring can be deformed around the bead of the rolling bellows such that the bead can be pressed against the support shoulder of the rolling piston.

3. A method for production of an air spring, wherein the air spring comprises:
a rolling bellows with an opening which has a bead reinforced by a core, and
a rolling piston with a seat for the rolling bellows and a support shoulder for the rolling bellows,
wherein the seat of the rolling piston has an axially protruding, substantially cylindrical securing ring, which, after mounting of the rolling bellows on the seat, protrudes axially beyond the bead of the rolling bellows, and the rolling piston is made of a thermoplastic material, wherein the method comprises:
placing of the rolling bellows on the seat of the rolling piston;
at least partial heating of the axially protruding securing ring of the rolling piston to the plasticization temperature of the plastic material of the rolling piston;
insertion of a forming die in the securing ring of the seat of the rolling piston, wherein the forming die has at least one substantially conical region, the first small diameter of which fits in the seat of the rolling piston, and a second diameter of which is larger than the first diameter;
axial pressing of the forming die into the securing ring of the rolling piston, wherein the conical region of the forming die shapes the seat of the rolling piston toward the radial outside; and
removing of the forming die.

4. The method as claimed in claim 3, wherein in its substantially conical region, the forming die has a forming region around the periphery which is curved concavely toward the radial outside, wherein a first small diameter of the forming region curved concavely toward the outside fits into the undeformed securing ring of the seat of the rolling piston, wherein when the forming die is pressed in, the securing ring of the rolling piston is not only pressed toward the outside but also deformed around the bead of the rolling bellows following the curvature of the forming die.

* * * * *